(12) United States Patent
Pochapsky

(10) Patent No.: US 8,363,321 B1
(45) Date of Patent: Jan. 29, 2013

(54) APPARATUS FOR INTRODUCING EXTERNAL AIMPOINT CORRECTIONS INTO A STANDALONE DAY SIGHT

(75) Inventor: Eugene J. Pochapsky, Cheswick, PA (US)

(73) Assignee: Omnitech Partners, Inc., Freeport, PA (US)

( * ) Notice: Subject to any disclaimer, the term of this patent is extended or adjusted under 35 U.S.C. 154(b) by 277 days.

(21) Appl. No.: 12/709,306

(22) Filed: Feb. 19, 2010

Related U.S. Application Data

(60) Provisional application No. 61/208,159, filed on Feb. 20, 2009.

(51) Int. Cl.
*G02B 27/64* (2006.01)
*G02B 5/04* (2006.01)

(52) U.S. Cl. ......... 359/557; 359/554; 359/831; 359/837

(58) Field of Classification Search ......... 359/399–431, 359/554–557, 831–837
See application file for complete search history.

(56) References Cited

U.S. PATENT DOCUMENTS

| | | | | |
|---|---|---|---|---|
| 5,194,908 | A | * | 3/1993 | Lougheed et al. ............ 356/28 |
| 5,481,394 | A | * | 1/1996 | Kimura .................... 359/234 |
| 5,862,001 | A | * | 1/1999 | Sigler ..................... 359/832 |
| 2005/0039370 | A1 | * | 2/2005 | Strong .................... 42/130 |
| 2005/0252062 | A1 | * | 11/2005 | Scrogin et al. ............ 42/119 |

* cited by examiner

*Primary Examiner* — Thong Nguyen

(57) ABSTRACT

An apparatus and method are provided for adjusting an angle of a scene viewed by a viewing optical system through an optical device by adjusting an angle of a light beam passing through the optical device. The angle of the scene is adjusted relative to an optical axis of a viewing optical system, in accordance with a signal. A mounting device may be adapted to mount the optical device to a support and adjust a position of the optical device relative to the viewing optical system.

20 Claims, 3 Drawing Sheets

APPARATUS FOR INTRODUCING EXTERNAL AIMPOINT CORRECTIONS INTO A STANDALONE DAY SIGHT

CROSS-REFERENCE TO RELATED APPLICATION

This application claims priority under 35 USC 119(e) to U.S. provisional Application Ser. No. 61/208,159 filed on Feb. 20, 2009, and which is incorporated herein by reference.

TECHNICAL FIELD

The present invention relates generally to optical systems, and more particularly to an apparatus for introducing external aimpoint corrections into a standalone day sight.

BACKGROUND

An operator of a viewing device may desire to adjust a line of sight while observing a scene through the viewing device. Targets at very long ranges may require high levels of magnification from a weapon sight. However, the bullet drop for a target at long range may be large enough to cause the target to be outside the field of view of the weapon sight at that high magnification. Some viewing devices may be manually adjusted so as to apply a specific angle of deviation to the image as viewed by the operator. For example, the impact point of a projectile as viewed by a day scope may be adjusted in angle so that it appears to be at a point designated by the day scope's reticle. The amount of adjustment changes when the day scope is used at different target ranges.

SUMMARY

In accordance with one embodiment, there is provided apparatus for use with a viewing optical system. The apparatus includes a first optical device, which is adapted to adjust an angle of a light beam passing through the optical device. The apparatus also includes an actuator, which is adapted to receive a first signal and control an amount by which the first optical device adjusts the angle of the light beam. The amount of the adjustment is controlled in accordance with the first signal. The apparatus is operable to adjust an angle of a scene viewed by the viewing optical system through the apparatus. The angle is adjusted relative to an optical axis of the viewing optical system.

In accordance with another embodiment, there is provided a method that includes receiving a first signal and, in accordance with the first signal, adjusting an angle of a scene viewed by a viewing optical system through an optical device by adjusting an angle of a light beam passing through the optical device. The angle of the scene is adjusted relative to an optical axis of a viewing optical system.

In yet another embodiment, there is provided an apparatus for use with a viewing optical system. The apparatus includes a first optical device, which is adapted to adjust an angle of a light beam passing through the optical device. The apparatus also includes an actuator, which is adapted to receive a first signal and control an amount by which the first optical device adjusts the angle of the light beam. The amount of the adjustment is controlled in accordance with the first signal. The apparatus further includes a mounting device, which is adapted to mount the first optical device and adjust a position of the first optical device relative to the viewing optical system. The apparatus is operable to adjust an angle of a scene viewed by the viewing optical system through the apparatus. The angle is adjusted relative to an optical axis of the viewing optical system.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

The present disclosure describes an apparatus for introducing external aimpoint corrections into a standalone day sight or other optical viewing system. The apparatus includes an optical device that is operable to adjust an angle of a scene viewed by a user of the viewing optical system. The angle is adjusted relative to an optical axis of the viewing optical system. The amount by which the optical device adjusts an angle of a light beam passing therethrough is adjustable by an actuator, in response to a signal or manual operation of the actuator.

An apparatus is disclosed that may be positioned between an input end of a viewing optical system and a scene being viewed with the viewing optical system. The apparatus includes an angular deviation optical element operable to produce a desired angular deviation in light passing through the apparatus, in order to alter an apparent location of an object in the scene being viewed. An image injection optical device may be positioned between the angular deviation optical element and the viewing optical system to provide a user of the viewing optical system with visual indicators. The apparatus may further include a sensing optical system operable to sense an amount of angular deviation being produced by the angular deviation optical element. The apparatus may be mounted to an input end of the viewing optical system. The apparatus may be mounted to a physical support structure to which the viewing optical system is also mounted. The apparatus may be mounted to the physical support structure using a mechanism that permits adjustment of a position of the apparatus relative to the viewing optical system.

Figure 1:
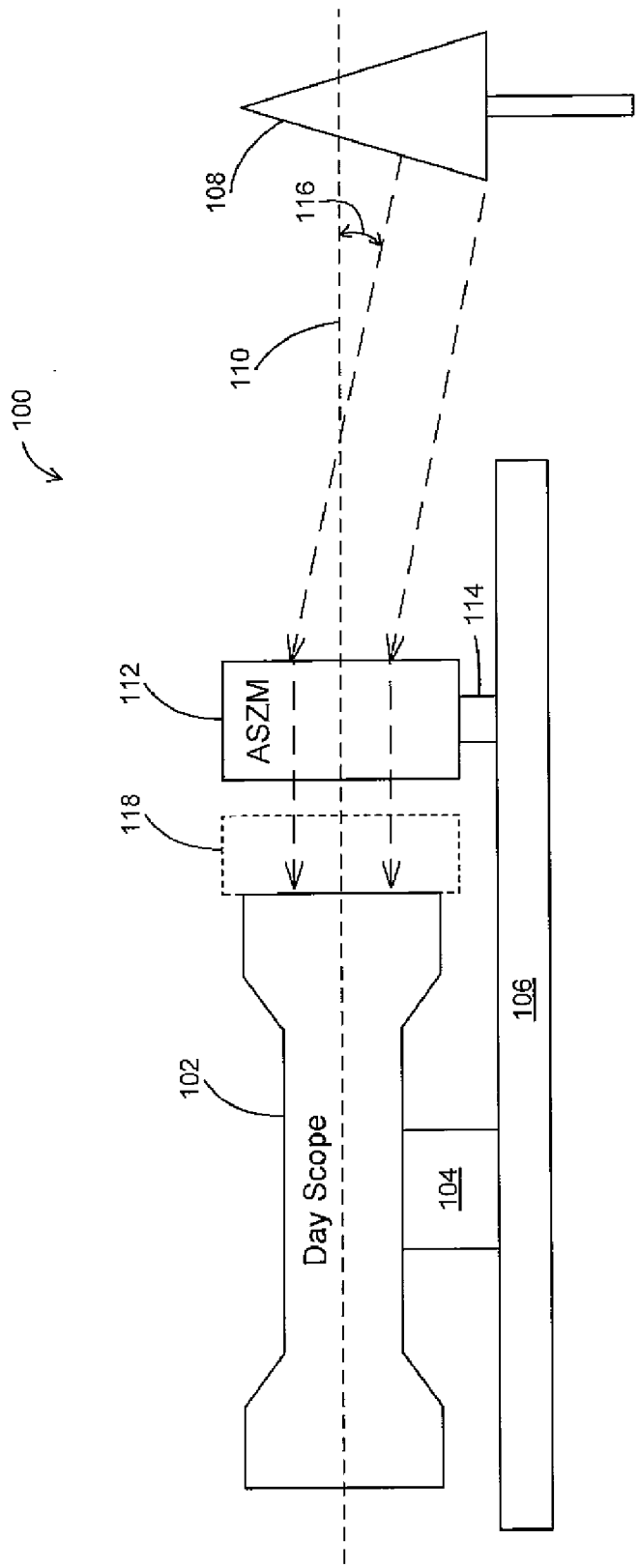
FIG. 1 illustrates a system employing an apparatus in accordance with an embodiment of the present disclosure for introducing external aimpoint corrections into a standalone day sight.

FIG. 1 illustrates a system 100 employing an apparatus 112 in accordance with an embodiment of the present disclosure for introducing external aimpoint corrections into a standalone day sight 102. The day sight 102 (or other viewing optical system) may be employed by a user to view a scene 108 along an optical axis 110. The day sight 102 is mechanically coupled by a mount 104 to a mounting rail 106, which may be part of a rifle or other weapon. In other embodiments, the day sight 102 may be mechanically coupled by the mount 104 directly to the rifle or other weapon.

An active sight zero module (ASZM) 112 is mechanically coupled to the mounting rail 106 by an alignment block 114. The ASZM 112 is operable to adjust an angle 116 of the scene 108 viewed by the user through the day scope 102. The angle 116 is measured relative to the optical axis 110. The ASZM 112 is also operable to combine a projected image with the view of the scene 108 observed by the user of the day sight 102. The alignment block 114 is operable to adjust a position of the ASZM 112 relative to the day scope 102.

The alignment block 114 may contain elevation, windage, and height adjustments for the ASZM 112. The height adjustment may be used to align the aperture of the ASZM 114 to the day scope 102 objective lens. The elevation and windage adjustments may operate to align a projected image from the ASZM 112 with respect to a reticle of the day scope 102.

Additionally, an optional night vision system 118 may be clipped onto the day scope 102. The night vision system 118 may provide either or both of an amplified visual light image and an infrared image shifted into the visible spectrum. In such an embodiment, the image projecting and combining capabilities of the ASZM 112 may be configured to operate with sensitivity level and/or spectral characteristics of the night vision system 118.

Figure 2:
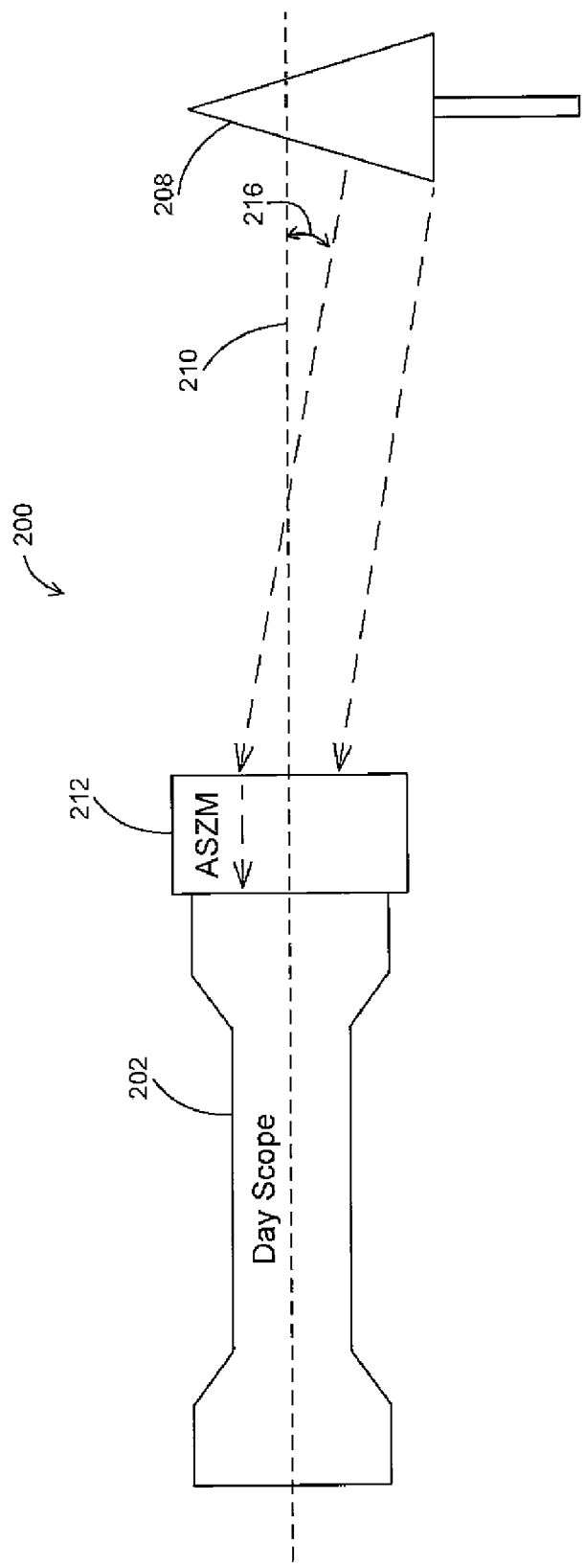
FIG. 2 illustrates a system employing an apparatus in accordance with another embodiment of the present disclosure for introducing external aimpoint corrections into a standalone day sight.

FIG. 2 illustrates a system 200 employing an apparatus 212 in accordance with another embodiment of the present disclosure for introducing external aimpoint corrections into a standalone day scope 202. The day sight 202 (or other viewing optical system) may be employed by a user to view a scene 208 along an optical axis 210.

An active sight zero module (ASZM) 212 is mechanically coupled to the day scope 202, using a clip-on or other type of mounting. The ASZM 212 is operable to adjust an angle 216 of the scene 208 viewed by the user through the day scope 202. The angle 216 is measured relative to the optical axis 210. The ASZM 212 is also operable to combine a projected image with the view of the scene 208 observed by the user of the day scope 202. The mechanical coupling of the ASZM 212 to the day scope 202 is operable to adjust a position of the ASZM 212 relative to the day scope 202.

Figure 3:
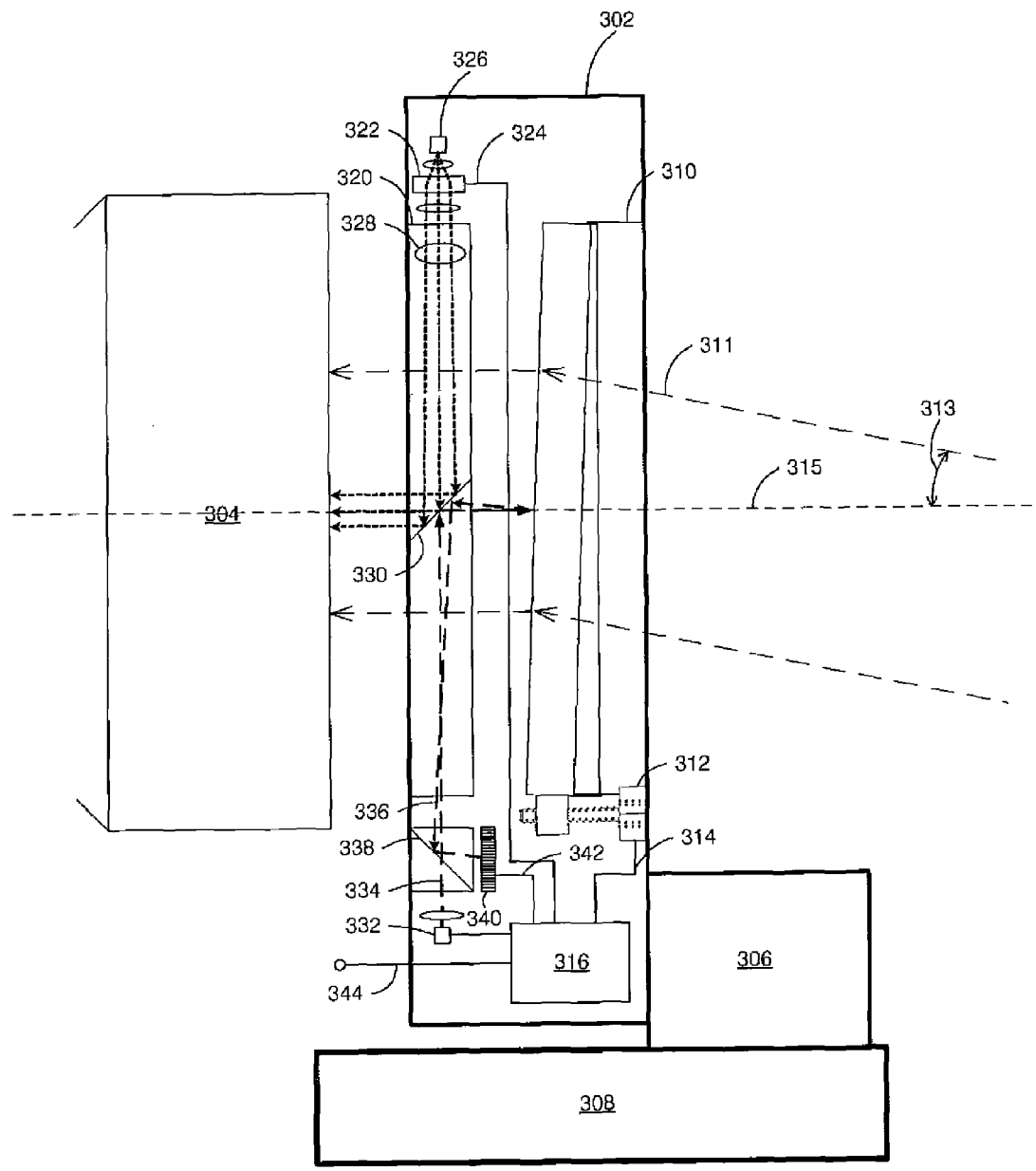
FIG. 3 illustrates an apparatus in accordance with an embodiment of the present disclosure for introducing external aimpoint corrections into a standalone day sight.

FIG. 3 illustrates an apparatus 302 in accordance with an embodiment of the present disclosure for introducing external aimpoint corrections into a standalone day scope 304. The ASZM 302 (or sight compensator) is mechanically coupled to a mounting rail 308 by an alignment block 306.

The ASZM 302 includes an optical device 310 that adjusts an angle of a light beam 311 passing through the optical device 310. The optical device 310 is a variable optical prism. A front surface of the prism is held in a fixed position and an angle of a back surface of the prism, relative to the front surface, is controlled to adjust the angle 313 of the light beam 311 passing through the optical device 310 and, thereby, an angle 313 of a scene viewed by a user through the day scope 304, relative to an optical axis 315 of the day scope 304. In other embodiments, the optical device 310 may be a liquid prism or a spherical variable prism.

While the angle 313 of the light beam 311 is adjusted downward, it will be understood that in other embodiments the optical device 310 may be adapted to controllably adjust the angle 313 in another direction, such as upwards or to a side. In still other embodiments the optical device 310 may be adapted to controllably adjust the angle 313 in a direction other than the four quadrants previously described, that is, in any desired direction.

An actuator 312 is mechanically coupled to the optical device 310 and is operable to adjust the angle of a back surface of the prism in response to a signal received on communication link 314. In other embodiments, the actuator 312 may be operable via a manual adjustment. The angle of the back surface of the prism relative to the front surface of the prism controls an angle of the light beam 311 passing through the optical device 310. The actuator 312 is a rotary motor driving a lead screw to position a nut that is mechanically coupled to the back surface of the prism and adjusts its angle. In other embodiments, other types of actuators may be used, such as voice coils, piezoelectric actuators, hydraulic, or pneumatic actuators. In embodiments where the optical device 310 is operable to adjust the angle 313 of the light beam 311 in more than a single direction, a plurality of actuators 312 may be employed to adjust the angle 313 in a desired direction.

The optical device 310 forms a portion of a front wall of the ASZM 302 and may provide an environmental seal for the ASZM 302. An image combining device 320 forms a portion of a back wall of the ASZM 302 and may also provide an environmental seal for the ASZM 302. The image combiner 320 includes a partially mirrored surface 330 that is angled so as to reflect into the day scope 304 an image 328 injected into the image combiner 320 from an upper side. The image 328 is formed by an LCD imager 322, which is illuminated by a light source 326. The LCD imager 322 forms an image in response to a signal received via communication link 324.

In other embodiments, the imager 322 may be an organic LED (OLED) device, a digital micro-mirror device (DMD), a beam-steering device, a reflective or transmissive liquid crystal display (LCD), or other suitable device. Such devices may generate an image (e.g., OLED, etc.) or modulate a light source to produce an image (e.g., DMD, beam-steering device, LCD, etc.). In some embodiments, the projected image is bright enough to be viewed in full sunlight.

The partially mirrored surface 330 is also used to measure an angle of the back surface of the optical device 310. A collimated LED 332 (or laser device) emits a sensing beam 334 that passes through a partially mirrored surface 338 and is reflected from the surface 330 toward the optical device 310. The sensing beam 334 reflects from the back surface of the optical device 310 at an angle determined by the angle of the back surface of the optical device 310. The angled sensing beam 336 is then reflected from the surface 330 and the surface 338 to a position sensor 340. Thus, the angled sensing beam 336 is positioned on the position sensor 340 according to the angle of the back surface of the optical device 310. The position sensor 340 is a multiple quadrant photodiode, a CMOS image sensor, or other sensor operable to produce a signal on communication link 342 indicative of a location of the angled sensing beam 336 on the position sensor 340.

The source wavelength of the sensing beam 334 may be selected so that the sensing beam 334 is prevented by reflection and/or absorption from being transmitted through the optical device 310, so as to prevent the sensing beam 334 from being observed during use.

A controller 316 is communicatively coupled to the actuator 312 via the communication link 314, the imager 322 via the communication link 324, and the sensor 340 via the communication link 342. The controller 316 is operable to drive the actuator to adjust the angle of the light beam 311 passing through the optical device 310. The controller 316 is operable to control a rate at which the angle changes, to prevent an image viewed through the ASZM 302 from changing more quickly than desired by a user of the day scope 304. The controller 316 is also operable to generate the image 328 injected into the day scope 304. The controller 316 is further operable to measure the angle of the light beam 311 passing through the optical device 310 by determining the position of the sensing beam on the sensor 340. The controller 316 is also operable to receive information and/or commands from an external device via a communication link 344.

When the day scope 304 is initially mounted to a weapon, the weapon may be operated to establish a battle sight zero (BSZ) at a specified range. The ASZM 302 may then be mounted to the weapon via the mounting rail 308 and set to an initial position where it makes no adjustment to an angle of a scene viewed by a user through the day scope 304, relative to the optical axis 315. In some embodiments, the initial position is a mechanical stop into which the actuator 312 is driven. In other embodiments, the initial position is a position stored in the controller 316 when the ASZM 302 is manufactured. In still other embodiments, the initial position is determined using optical position feedback from the sensor 340.

An electronic alignment reticle with horizontal and vertical lines may be projected into the day scope 304 by the ASZM 302. The electronic alignment reticle may be distinguished with respect to other active reticles by color, shape, and/or position. The user may then operate the alignment block 306 in order to overlay the projected electronic alignment reticle of the ASZM 302 over a reticle of the day scope 304. After this alignment, the ASZM 302 is registered to the BSZ at the specified range. Also, the projection system of the ASZM 302 is substantially aligned to the BSZ, so that the ASZM 302 may be used to indicate or deviate the BSZ with respect to the setting of the day sight 304. Through use of the ASZM 302, an operator does not have to modify the day scope elevation and/or windage adjustments and therefore does not have to alter BSZ during a mission.

The ASZM 302 may be used to compensate for bullet drop in front of the day sight. Targets at very long ranges may require high levels of magnification from the day scope 304. In such cases, the bullet drop may be large enough to cause the target to be outside the field of view of the day scope 304 at that high magnification. Using the ASZM 302 to compensate the view of the target provided to the day scope 304 may eliminate this issue.

The controller 316 may receive the weapon platform characteristics and the range at which BSZ was set. The controller may operate the imager 322 to display to the user of the day scope 304 information such as the BSZ range, whether active compensation of the sight zero is taking place, a magnitude of a compensation being provided by the ASZM 302 (which may be displayed in Mils [milliradians], MOA [minutes of angle], or other suitable units).

The day scope 304 does not need to be modified to accommodate the ASZM 302. Feedback from the day scope 304 to the ASZM 302 or other parts of the system is not required. Because angular deviations may be computed in target space using standard weapon data and the current BSZ range, all compensations for aim point may be accomplished in the ASZM 302. Many types of scopes or other viewing optical systems may be placed behind a sight compensator according to the present disclosure. Furthermore, a sight compensator according to the present disclosure may be installed without interfering with an inline clip-on night vision systems.

The controller 316 may receive one or more commands via the communication link 344. One such command may specify a response time for adjusting the angle 313 of the light beam 311 to a desired magnitude. Another such command may be a maximum angle slew rate—which may be chosen to prevent the image presented to a user of the day scope 304 from moving too quickly.

Still other commands received by the controller 316 may include factors such as environmental factors, a target lead amount that is factored into an impact point prediction, a target range, and/or weapon characteristics. Such factors may be accounted for in a predicted point of impact calculation, which may in turn be converted into an amount of active compensation of the sight zero provided by the optical device 310 and/or displayed by the image combiner 320.

Yet other such commands received by the controller 316 may include instructions for accommodating errors. Where there is an error between a commanded and a desired aimpoint deviation, the image combiner 320 may display error bars that grow or shrink in proportion to the aiming errors. In other embodiments, the image combiner 320 may display a projected bright reticle that indicates a desired aimpoint (such a reticle would be superimposed upon the day scope reticle in the case where there is no error). In still other embodiments, the image combiner 320 may display a circle whose diameter includes the expected aimpoint.

Where there are errors due to random movement of the target or random measurement errors, the image combiner 320 may project a reticle that follows the error signal between the actual and the desired aimpoint. Such a projected reticle may show more rapid movements in the aimpoint, while the optical device 310 tracks a low-pass filtered version of the desired aimpoint track. In other embodiments, the image combiner 320 may display error bars or circles that indicate a magnitude of the expected error based upon factors such as current wind statistics and/or a difference between the desired aimpoint and the actual aimpoint.

The image combiner 320 may provide status displays to a user of the day scope 304. A projected compensation/alignment reticle may indicate that the ASZM 302 is active. Alignment between the projected reticle and the reticle of the day scope 304 may indicate successful aimpoint compensation by the ASZM 302. Numeric information may be displayed, such as aimpoint data, magnitude of compensation, a battle sight zero range, target range, battery status, or other suitable operational status information.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for use with a viewing optical system, the apparatus comprising:
   a first optical device, adapted to adjust an angle of a light beam passing through the optical device;
   an actuator configured to receive a first signal and control an amount by which the first optical device adjusts the angle of the light beam, wherein the amount is controlled in accordance with the first signal;
   a second optical device positioned to pass the light beam after the light beam passes through the first optical device; and a sensor configured to measure an amount by which the first optical device adjusts the angle of the light beam based on a sensing beam transmitted through the second optical device, wherein the apparatus is configured to adjust an angle, relative to an optical axis of the viewing optical system, of a scene viewed by the viewing optical system through the apparatus.

2. The apparatus of claim 1, wherein the actuator is further configured to control a rate of change of the amount by which the first optical device adjusts the angle of the light beam.

3. The apparatus of claim 1, wherein the second optical device includes a partially mirrored surface, the second optical device configured to:

combine the light beam with an image after the light beam passes through the first optical device using the partially mirrored surface; and pass the sensing beam to the first optical device using the partially mirrored surface.

4. The apparatus of claim 1, wherein the second optical device is configured to combine the light beam with an image after the light beam passes through the first optical device, wherein the apparatus is configured to combine the image with the scene viewed by the viewing optical system through the apparatus.

5. The apparatus of claim 4, further comprising:
a controller configured to:
receive a second signal indicating information associated with the scene;
produce the first signal in accordance with the second signal; and
produce the image in accordance with the second signal.

6. The apparatus according to claim 5, wherein the controller is further configured to:
receive a third signal from the sensor related to the measured amount by which the first optical device adjusts the angle of the light beam; and
produce the image further in accordance with the third signal.

7. The apparatus according to claim 5, wherein the controller is further adapted to:
produce the first signal in accordance with a low-pass filtered version of the second signal; and
produce the image in accordance with a high-pass filtered version of the second signal.

8. A method comprising:
receiving a first signal;
in accordance with the first signal, adjusting an angle, relative to an optical axis of a viewing optical system, of a scene viewed by the viewing optical system through a first optical device by adjusting an angle of a light beam passing through the first optical device;
passing the light beam through a second optical device after the light beam passes through the first optical device; and
measuring an amount by which the first optical device adjusts the angle of the light beam based on a sensing beam transmitted through the second optical device.

9. The method of claim 8, further comprising:
controlling a rate of change of the amount by which the first optical device adjusts the angle of the light beam.

10. The method of claim 9, further comprising:
combining the light beam with an image after the light beam passes through the first optical device using a partially mirrored surface in the second optical device; and passing the sensing beam to the first optical device using the partially mirrored surface.

11. The method of claim 9, further comprising:
combining the light beam with an image after the light beam passes through the first optical device.

12. The method of claim 11, further comprising:
receiving a second signal indicating information associated with the scene;
producing the first signal in accordance with the second signal; and
producing the image in accordance with the second signal.

13. The method of claim 12, further comprising:
producing the image further in accordance with the measured amount by which the first optical device adjusts the angle of the light beam.

14. The method of claim 12, further comprising:
producing the first signal in accordance with a low-pass filtered version of the second signal; and
producing the image in accordance with a high-pass filtered version of the second signal.

15. An apparatus for use with a viewing optical system, the apparatus comprising:
a first optical device configured to adjust an angle of a light beam passing through the first optical device;
an actuator configured to receive a first signal and control an amount by which the first optical device adjusts the angle of the light beam, wherein the amount is controlled in accordance with the first signal;
a second optical device positioned to pass the light beam after the light beam passes through the first optical device;
a sensor configured to measure an amount by which the first optical device adjusts the angle of the light beam based on a sensing beam transmitted through the second optical device; and
a mounting device configured to mount the first optical device and adjust a position of the first optical device relative to the viewing optical system,
wherein the apparatus is configured to adjust an angle, relative to an optical axis of the viewing optical system, of a scene viewed by the viewing optical system through the apparatus.

16. The apparatus of claim 15, wherein the actuator is further configured to control a rate of change of the amount by which the first optical device adjusts the angle of the light beam.

17. The apparatus of claim 15, wherein the second optical device includes a partially mirrored surface, the second optical device configured to:
combine the light beam with an image after the light beam passes through the first optical device using the partially mirrored surface; and
pass the sensing beam to the first optical device using the partially mirrored surface.

18. The apparatus of claim 15, wherein the second optical device is configured to combine the light beam with an image after the light beam passes through the first optical device,
wherein the apparatus is configured to combine the image with the scene viewed by the viewing optical system through the apparatus.

19. The apparatus of claim 18, further comprising:
a controller configured to:
receive a second signal indicating information associated with the scene;
produce the first signal in accordance with the second signal; and
produce the image in accordance with the second signal.

20. The apparatus according to claim 19, wherein the controller is further adapted configured to:
receive a third signal from the sensor related to the measured amount by which the first optical device adjusts the angle of the light beam; and
produce the image further in accordance with the third signal.

* * * * *